(12) United States Patent
Lenaerts et al.

(10) Patent No.: US 10,625,494 B2
(45) Date of Patent: Apr. 21, 2020

(54) MANUFACTURING OF DECORATIVE SURFACES

(71) Applicants: AGFA NV, Mortsel (BE); UNILIN BVBA, Wielsbeke (BE)

(72) Inventors: Jens Lenaerts, Mortsel (BE); Nadine Willems, Mortsel (BE); Hubertus Van Aert, Mortsel (BE)

(73) Assignees: AGFA NV, Mortsel (BE); UNILIN BVBA, Wielsbeke (BE)

( * ) Notice: Subject to any disclaimer, the term of this patent is extended or adjusted under 35 U.S.C. 154(b) by 0 days.

(21) Appl. No.: 16/337,441

(22) PCT Filed: Sep. 26, 2017

(86) PCT No.: PCT/EP2017/074341
§ 371 (c)(1),
(2) Date: Mar. 28, 2019

(87) PCT Pub. No.: WO2018/060182
PCT Pub. Date: Apr. 5, 2018

(65) Prior Publication Data
US 2020/0039190 A1 Feb. 6, 2020

(30) Foreign Application Priority Data
Sep. 30, 2016 (EP) .................................... 16191676

(51) Int. Cl.
*B32B 27/08* (2006.01)
*B32B 5/02* (2006.01)
(Continued)

(52) U.S. Cl.
CPC ................ *B32B 27/08* (2013.01); *B32B 3/06* (2013.01); *B32B 5/02* (2013.01); *B32B 27/12* (2013.01);
(Continued)

(58) Field of Classification Search
USPC ....... 52/311.1, 311.2; 156/277, 308.2, 309.9, 156/311
See application file for complete search history.

(56) References Cited

U.S. PATENT DOCUMENTS 6,280,553 B1 * 8/2001 Yang ....................... B44C 1/105
156/235
8,876,274 B2 * 11/2014 Haneda ................ B41J 2/14274
347/100
(Continued)

FOREIGN PATENT DOCUMENTS

EP   2 402 154 A1   1/2012
EP   2 865 527 A1   4/2015
(Continued)

OTHER PUBLICATIONS

Official Communication issued in International Patent Application No. PCT/EP2017/074341, dated Jan. 30, 2018.
(Continued)

*Primary Examiner* — Brian E Glessner
*Assistant Examiner* — Adam G Barlow
(74) *Attorney, Agent, or Firm* — Keating and Bennett, LLP

(57) ABSTRACT

A method for manufacturing decorative surfaces includes, in order, the steps of a) inkjet printing an image on a first thermoplastic foil by jetting and UV curing one or more pigmented free radical UV curable inkjet inks on the first thermoplastic foil; b) applying on the inkjet printed image a second thermoplastic foil carrying a layer containing a vinylchloride-vinylacetate-vinylalcohol copolymer with the layer facing the inkjet printed image on the first thermoplastic foil; and c) heat pressing the first and second thermoplastic foils into a decorative laminate; wherein at least one of the first and second thermoplastic foils is transparent, and the one or more pigmented free radical UV curable
(Continued)

inkjet inks contain a polymerizable composition having: 30 to 90 wt % of one or more compounds with one ethylenically unsaturated polymerizable group; 10 to 70 wt % of one or more compounds with two ethylenically unsaturated polymerizable groups; and 0 to 10 wt % of one or more compounds with three or more ethylenically unsaturated polymerizable groups.

15 Claims, 2 Drawing Sheets

(51) Int. Cl.
| | |
|---|---|
| B32B 27/12 | (2006.01) |
| B32B 27/30 | (2006.01) |
| B32B 37/06 | (2006.01) |
| B32B 37/10 | (2006.01) |
| B32B 37/18 | (2006.01) |
| B32B 38/00 | (2006.01) |
| B41M 5/00 | (2006.01) |
| B41M 7/00 | (2006.01) |
| E04F 15/02 | (2006.01) |
| E04F 15/10 | (2006.01) |
| B32B 3/06 | (2006.01) |

(52) U.S. Cl.
CPC .......... *B32B 27/304* (2013.01); *B32B 27/306* (2013.01); *B32B 37/06* (2013.01); *B32B 37/10* (2013.01); *B32B 37/182* (2013.01); *B32B 38/0004* (2013.01); *B32B 38/0008* (2013.01); *B32B 38/145* (2013.01); *B41M 5/0047* (2013.01); *B41M 7/0027* (2013.01); *B41M 7/0081* (2013.01); *E04F 15/02038* (2013.01); *E04F 15/107* (2013.01); *B32B 2255/10* (2013.01); *B32B 2255/26* (2013.01); *B32B 2262/101* (2013.01); *B32B 2305/28* (2013.01); *B32B 2307/41* (2013.01); *B32B 2307/412* (2013.01); *B32B 2310/0831* (2013.01); *B32B 2315/085* (2013.01); *B32B 2327/06* (2013.01); *B32B 2329/04* (2013.01); *B32B 2331/04* (2013.01); *B32B 2451/00* (2013.01); *B32B 2607/00* (2013.01); *E04F 2201/043* (2013.01)

(56) References Cited

U.S. PATENT DOCUMENTS

| | | | |
|---|---|---|---|
| 9,994,010 | B2* | 6/2018 | Pervan ................. B32B 38/145 |
| 2015/0298494 | A1* | 10/2015 | Ohnishi ............... B41M 5/0047 |
| | | | 156/249 |
| 2016/0016391 | A1* | 1/2016 | Lundblad ................ B32B 27/08 |
| | | | 428/195.1 |
| 2017/0218520 | A1* | 8/2017 | De Mondt ........... C09D 11/101 |
| 2017/0348978 | A1* | 12/2017 | Van Garsse ............ B41J 2/2135 |

FOREIGN PATENT DOCUMENTS

| | | |
|---|---|---|
| WO | 2011/077311 A2 | 6/2011 |
| WO | 2011/103641 A1 | 9/2011 |
| WO | 2014/084787 A1 | 6/2014 |
| WO | 2016/188743 A1 | 12/2016 |

OTHER PUBLICATIONS

Lenaerts et al., "Inkjet Printing Methods for Decorative Surfaces", U.S. Appl. No. 16/337,444, filed Mar. 28, 2019.

* cited by examiner

MANUFACTURING OF DECORATIVE SURFACES

CROSS REFERENCE TO RELATED APPLICATIONS

This application is a 371 National Stage Application of PCT/EP2017/074341, filed Sep. 26, 2017. This application claims the benefit of European Application No. 16191676.2, filed Sep. 30, 2016, which is incorporated by reference herein in its entirety.

BACKGROUND OF THE INVENTION

1. Field of the Invention

The present invention relates to the manufacturing of decorative surfaces, preferably decorative panels or tiles, using inkjet technology. The invention relates in particular to decorative panels of PVC (polyvinyl chloride), also called vinyl tiles or vinyl strips. Often, also the abbreviation LVT is used for such tiles, which stands for Luxurious Vinyl Tile.

2. Description of the Related Art

Gravure, offset and flexography are being increasingly replaced for different applications by industrial inkjet printing systems, because of their flexibility in use, such as variable data printing making short production runs and personalized products possible at low cost, and their enhanced reliability, allowing incorporation into production lines.

EP 2865527 A (AGFA GRAPHICS) discloses a method of manufacturing a decorative surface including the steps of: a) impregnating a paper substrate with a thermosetting resin; b) jetting a colour pattern with one or more aqueous inkjet inks including a polymer latex binder on the thermosetting resin impregnated paper; c) drying the one or more aqueous inkjet inks; and d) heat pressing the thermosetting paper carrying the colour pattern into a decorative surface.

A major drawback of these wood- and paper-based decorative panels is their limited water resistance, which prevents their use in bathrooms and kitchens.

One approach is to use a water-resistant broadloom decorative surface, for example by applying wall-to-wall a PVC flooring roll. However, as the walls and entrances of rooms generally have multiple corners and indentations, the application of such a large flooring roll requires experienced workers and removal of all furniture from the room.

Another approach is to resolve the water resistance issue by replacing wood- and paper-based layers in decorative panels by water resistant polymeric layers. Such polymeric based floor panels employing polymers like polyvinyl chloride are disclosed by e.g. WO 2011/077311 A (FLOORING INDUSTRIES). These polymeric floor panels have interlock structures that interlock with similar panels having similar interlock structures allowing easy do-it-yourself mounting of a glue-free floor surface covering. The decorative layer in such floor panels is made by gravure printing water-based or solvent-based inks having a relatively high viscosity on a thermoplastic foil made of PVC.

Inkjet inks in general have a relatively low viscosity, which cause image quality problems, e.g. bleeding, when printing water-based or solvent-based inkjet inks on a thermoplastic foil made of PVC.

The unpublished patent application PCT/EP2016/060507 (AGFA & UNILIN) discloses a method for manufacturing decorative surfaces including the steps of: a) inkjet printing (19) an image on a first thermoplastic foil (12) using a pigmented UV curable inkjet ink; b) applying a second thermoplastic foil (12) on the inkjet printed image; and c) heat pressing (20) the first and second thermoplastic foils into a decorative laminate; wherein the pigmented UV curable inkjet ink contains a polymerizable composition having 30 to 70 wt % of monofunctional polymerizable compounds and 30 to 70 wt % of polyfunctional polymerizable compounds, wherein the weight percentage wt % is based on the total weight of the polymerizable composition; and wherein at least one of the first and second thermoplastic foils is a transparent foil. The decorative panels of the invention exhibit good adhesion and no cracking. However sometimes still higher flexibility is required for highly curved surfaces, for example, around pillars.

Hence, there is still a need for improved manufacturing methods of decorative surfaces using inkjet technology.

SUMMARY OF THE INVENTION

In order to overcome the problems described above, preferred embodiments of the present invention have been realised with a method for manufacturing decorative surfaces as defined below.

The use of specific pigmented UV curable inkjet inks in combination with a specific vinylchloride-vinylacetate copolymer allowed obtaining decorative panels with excellent image quality, adhesion, high flexibility and no cracking of the print during embossing.

The manufacturing process was made much simpler allowing it to be completely performed at the facilities of the decorative panel manufacturer.

One advantage for the decorative panel manufacturer is that the large stock of non-digitally printed decorative rolls could be eliminated as just-in-time UV inkjet printing was incorporated in the manufacturing process. Another advantage of this was that it became possible to react much faster to market trends and that waste of decorative rolls was eliminated as they did not have to be ordered at a decor printer in a minimum purchasing quantity and way in advance.

In-house printing allows for a wide product variety and customized products, e.g. decorative panels including company logo's, and this without substantial financial penalties.

Another advantage of inkjet printing is that the manufacturing process could be controlled to a level that, for example, an embossed wood grain is in perfect alignment with the inkjet printed wood colour pattern.

Further advantages and embodiments of the present invention will become apparent from the following description.

DETAILED DESCRIPTION OF THE PREFERRED EMBODIMENTS

Definitions

Figure 1:
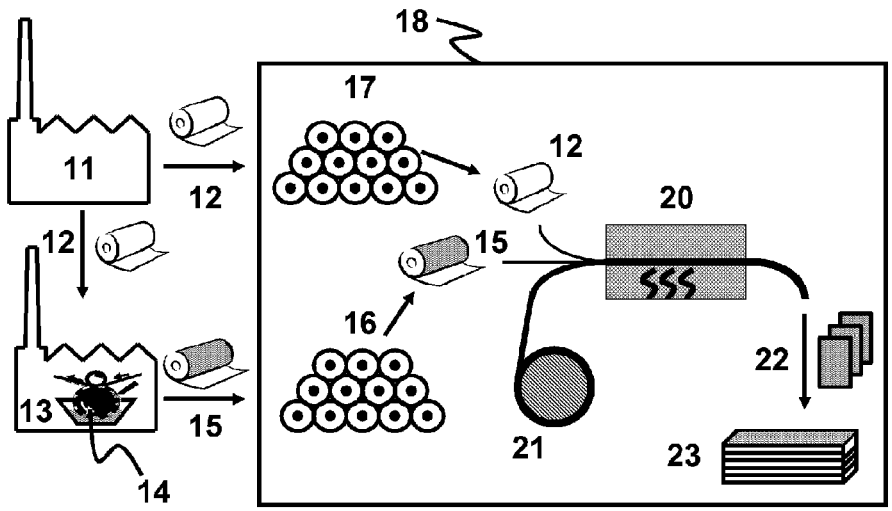
FIG. 1 shows the prior art production process for manufacturing polymeric decorative panels, wherein a PVC roll manufacturer (11) supplies a PVC roll (12) to a decor printer (13) using gravure printing (14) in order to deliver a decorative PVC roll (15) to a warehouse (16) of a floor panel manufacturer (18). The PVC roll manufacturer (11) supplies also PVC rolls (12) to a warehouse (17) of the floor panel manufacturer (18), who makes an assembly of layers from the PVC roll (12), the decorative PVC roll (15) and a base layer (21) which after heat-pressing (20) into a single unit are cut into decorative panels (22) that are collected in a decorative panel set (23) ready for sale.
Figure 2:
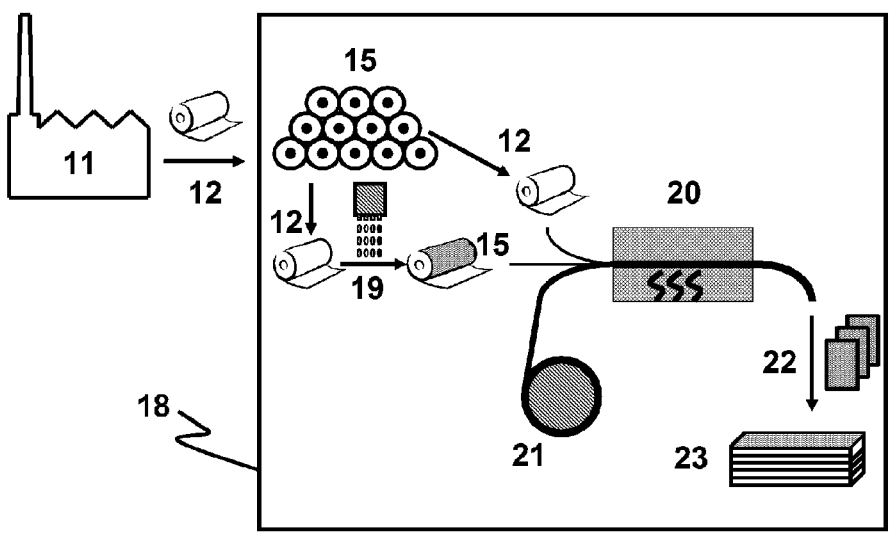
FIG. 2 shows a production process for manufacturing polymeric decorative panels, wherein a PVC roll manufacturer (11) supplies PVC rolls (12) to a warehouse (15) of a floor panel manufacturer (18), who prepares a decorative PVC roll (15) by inkjet printing (19) on a PVC roll (12). The floor panel manufacturer (18) then makes an assembly of layers from the PVC roll (12), the decorative PVC roll (15) and a base layer (21) which after heat-pressing (20) into a single unit are cut into decorative panels (22) that are collected in a decorative panel set (23) ready for sale.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Manufacturing Methods of Decorative Surfaces

A method for manufacturing decorative surfaces including, in order, the steps of:

a) inkjet printing (19) an image on a first thermoplastic foil (12) by jetting and UV curing one or more pigmented free radical UV curable inkjet inks on the first thermoplastic foil (12); b) applying on the inkjet printed image a second thermoplastic foil (12) carrying a layer containing a vinylchloride-vinylacetate-vinylalcohol copolymer with the layer facing the inkjet printed image on the first thermoplastic foil; and c) heat pressing (20) the first and second thermoplastic foils into a decorative laminate; wherein at least one of the first and second thermoplastic foils is a transparent thermoplastic foil; and wherein the one or more pigmented free radical UV curable inkjet inks contain a polymerizable composition having: 30 to 90 wt % of one or more compounds with one ethylenically unsaturated polymerizable group; 10 to 70 wt % of one or more compounds with two ethylenically unsaturated polymerizable groups; and 0 to 10 wt % of one or more compounds with three or more ethylenically unsaturated polymerizable groups, wherein all weight percentages wt % are based upon the total weight of the polymerizable composition.

In a more preferred embodiment, the above method includes a step d) of cutting the laminate into a decorative panel (22). The method of the invention can also be used to manufacture broadloom decorative surfaces (e.g. vinyl rolls), but is preferably used for manufacturing decorative panels, as the latter do not require experienced workers for their application and removal of all furniture from a room.

The foils are thermoplastic so that they can be fused together during heat-pressing (20). Heat pressing is preferably performed by preheating the first and second thermoplastic foils preferably to a temperature above 130° C., more preferably between 140 and 170° C., and preferably then using a cooled press to fuse them into a decorative laminate. Alternatively, the press containing the first and second thermoplastic foils may be heated to a temperature above 130° C., followed by cooling the press to fuse the first and second thermoplastic foils into a decorative laminate. The pressure used in both methods is preferably more than 10 bar, more preferably between 15 and 40 bar.

The thermoplastic foils are preferably selected from the groups consisting of polyvinyl chloride (PVC), polyolefins like polyethylene (PE) and polypropylene (PP), polyamides (PA), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or co-polymers of these.

In a preferred embodiment, the first and second thermoplastic foils are polyvinyl chloride foils. The polyvinylchloride foils are preferably of the rigid type including less than 10 wt % of plasticizer, more preferably these PVC foils contain 0 to 5 wt % of plasticizer. The plasticizer may be a phthalate plasticizer, but is preferably a non-phthalate plasticizer for health reasons.

Preferred non-phthalate plasticizers include diisononyl cyclohexane-1,2-dicarboxylate (DINCH), dipropylene glycol dibenzoate (DGD), diethylene glycol dibenzoate (DEGD), triethylene glycol dibenzoate (TEGD), acetylated monoglycerides of fully hydrogenated castor oil (COMGHA) isosorbide esters, bis-(2-ethylhexyl) terephthalate, vegetable oil based plasticizers like Ecolibrium™ from DOW, and blends thereof.

In a preferred embodiment, the pigmented UV curable inkjet ink is cured using UV LEDs.

Decorative Surfaces

Here below the invention will be disclosed for decorative panels, but with the exception of the tongue and groove profiles, the invention is equally applicable to a broadloom decorative surface, such as a vinyl roll.

A decorative panel (22) obtained by the method according to the present invention includes an inkjet printed image between two thermoplastic foils,
wherein at least one of the two thermoplastic foils is a transparent foil. A transparent foil is necessary to make the inkjet printed image viewable as it is located on the inside of the decorative laminate.

In a preferred embodiment, the decorative panel (22) includes an inkjet printed image on a first thermoplastic foil (34), which is preferably an opaque thermoplastic foil, while the second thermoplastic foil (33) is transparent and carries a layer containing a vinylchloride-vinylacetate-vinylalcohol copolymer.

In an alternative embodiment, the decorative panel (22) includes an inkjet printed image on a transparent first thermoplastic foil (33), while the second thermoplastic foil (34) is preferably opaque and carrying a layer containing a vinylchloride-vinylacetate-vinylalcohol copolymer.

The advantage of having an opaque thermoplastic foil is that the colour vividness of the inkjet printed image is enhanced and that any defects and irregularities in the optional base layer are masked and thus cannot influence image quality. The opaque thermoplastic foil is preferably a white opaque thermoplastic foil, but may also be a yellowish or brownish opaque thermoplastic foil for reducing ink consumption during inkjet printing.

In a more preferred embodiment, the decorative panel (22) includes a tongue (31) and groove (32) for glue-less interlocking with decorative panels having a similar tongue and groove. In a more preferred embodiment, the tongue (31) and groove (32) are part of the base layer (35).

Figure 3:
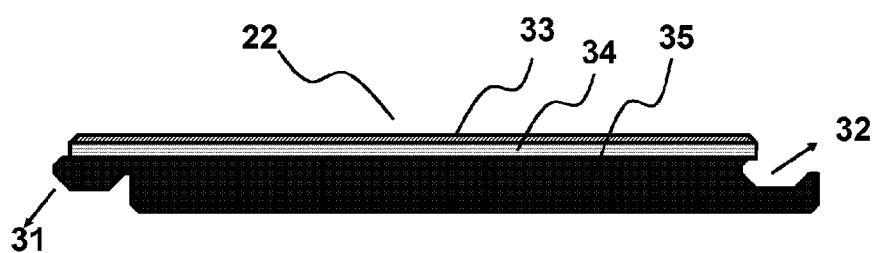
FIG. 3 shows a cross-section of a decorative panel (22) including a base layer (35) with a tongue (31) and groove (32) laminated on the top side by a transparent or opaque thermoplastic foil (34) and a transparent thermoplastic foil (33).

Decorative panels including a tongue and a groove of a special shape (see FIG. 3) can be clicked into one another. The advantage thereof is a fast and easy assembly of a floor or wall requiring no glue. The shape of the tongue and groove necessary for obtaining a good mechanical join is well-known in the art of laminate flooring, as exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

A decorative panel, like a floor panel, has a single inkjet printed image on a thermoplastic foil. However, an inkjet printed image may also be present on both sides of a base layer. The latter is especially desirable in the case of decorative panels for furniture. In such a case, preferably the inkjet printed images are located between two thermoplastic foils on both sides of the base layer.

The decorative panels may have any desired shape such as a square, a rectangle or an octagon. For flooring, the decorative panels preferably have a rectangular shape, for example, 18 cm×140 cm, and a thickness of 2 to 6 mm. At a thickness of no more than 6 mm, a large floor surface can be covered by a rather limited total weight of decorative panels. The low weight increases comfort when installing the decorative panels and causes a financial benefit in transport to warehouses compared to heavier wood based decorative panels.

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free from repetitions.

In a preferred embodiment the decorative panels are selected from the group consisting of kitchen panels, flooring panels, furniture panels, ceiling panels and wall panels.

The decorative panels may further include a sound-absorbing layer. An example of such a sound-absorbing layer is disclosed by U.S. Pat. No. 8,196,366 (UNILIN).

First Thermoplastic Foils

The first thermoplastic foil includes a thermoplastic foil and an image, usually a colour pattern, printed thereon by inkjet.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it and being easy replaceable over time according to fashion.

The first thermoplastic foil preferably has a thickness of at least 80 μm. When the inkjet image is printed on a transparent thermoplastic foil used as a protective outer layer of the decorative laminate, it preferably has a thickness of more than 100 μm, more preferably 200 to 700 μm, and most preferably 300 to 500 μm.

If the first thermoplastic foil is used as a protective outer layer of the decorative laminate, it may include additional finishing layers on it surface as described here below for the second thermoplastic foil.

Second Thermoplastic Foils

The second thermoplastic foil carries a layer contains a vinylchloride-vinylacetate-vinylalcohol copolymer. Such a layer assures optimal adhesion to the inkjet printed image while the flexibility can be maximized by using pigmented free radical UV curable inkjet inks having high amounts compounds with one ethylenically unsaturated polymerizable group in the polymerizable composition of the inkjet inks. The layer preferably includes a vinylchloride-vinylacetate-vinylalcohol copolymer containing more than 80 wt % of vinyl chloride and 1 to 15 wt % of vinylalcohol on the total weight of the copolymer. Another advantage of including the vinylalcohol in the specific vinylchloride-vinylacetate copolymer is that the layer becomes not tacky and the second thermoplastic foil can be stored as a roll without causing issues of stickiness.

The application of the layer containing a vinylchloride-vinylacetate-vinylalcohol copolymer is preferably performed using a coating technique selected from spray coating, dip coating, knife coating, extrusion coating, spin coating, slide hopper coating and curtain coating.

The layer containing a vinylchloride-vinylacetate-vinylalcohol copolymer is applied to have a dry weight of preferably 1 to 10 g/m$^2$, more preferably 2 to 7 g/m$^2$, and most preferably 3 to 6 g/m$^2$. Less than 1 g/m$^2$ did not provide good adhesion, while above 10 g/m$^2$ problems of tackiness and stickiness could again be observed. A very consistent quality was obtained when coated at a dry weight of 2 to 6 g/m$^2$.

A coating solution of the vinylchloride-vinylacetate-vinylalcohol copolymer is preferably made using an organic solvent having a boiling point of no more than 95° C. at normal pressure. This allows for fast drying which is especially needed in a set-up of a single-pass inkjet printing process. The organic solvent for the vinylchloride-vinylacetate-vinylalcohol copolymer is preferably selected from methyl ethyl ketone or ethyl acetate for minimizing explosion risk.

The second thermoplastic foil is preferably used in the decorative laminate as the outer layer, thus forming a transparent protective layer for the viewable inkjet image. However, additional finishing layers may be applied upon the protective layer.

In a preferred embodiment, an antistatic layer is applied on the protective layer. Techniques to render decorative panels antistatic are well-known in the art of decorative laminates as exemplified by EP 1567334 A (FLOORING IND).

In a particular preferred embodiment, the decorative panel has a polyurethane finishing layer on the protective layer.

The top surface of the decorative surface, i.e. at least the protective layer, is preferably provided with a relief matching the colour pattern, such as for example the wood grain, cracks and knots in a woodprint. Embossing techniques to accomplish such relief are well-known in the art of flooring panels as disclosed by, for example, EP 1290290 A (FLOORING IND), US 2006144004 (UNILIN), EP 1711353 A (FLOORING IND) and US 2010192793 (FLOORING IND).

Most preferably the relief is formed by pressing a digital embossing plate, roll or belt against the thermoplastic foil forming the protective layer during heat-pressing.

A digital embossing plate is a plate which comprises elevations that can be used to form a relief on decorative panel by pressing the digital embossing plate against the protective layer of the decorative panel or nested decorative panels. The elevations may be cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative panels by pressing and rotating the digital embossing cylinder against the protective layer of the decorative panels.

A finishing layer, preferably a polyurethane finishing layer, may include hard particles, like corundum, for preventing scratching of the top surface. The total quantity of hard particles is preferably between 1 g/m$^2$ and 100 g/m$^2$, preferably 2 g/m$^2$ to 50 g/m$^2$.

Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles may determined in function of the desired scratch resistance.

Hard particles having an average particle size of between 1 and 200 μm are preferred. Preferably an amount of such particles of between 1 and 40 g/m$^2$ is applied above the printed pattern. An amount lower than 20 g/m$^2$ can suffice for the lower qualities.

The second thermoplastic foil preferably has a thickness of at least 80 μm. When the second thermoplastic foil is used as a protective outer layer of the decorative laminate, it preferably has a thickness of more than 100 μm, more preferably 200 to 700 μm, and most preferably 300 to 500 μm.

Base Layers

In a preferred embodiment, the decorative panel (22) includes a base layer (35). The base layer provides sufficient rigidness to the decorative panel, so that when e.g. a long rectangular decorative panel bends under its own weight, the panel does not break. For this reason, the base layer is preferably reinforced with fibres.

In a decorative surface (22), the base layer (21, 35) is attached to the side of the opaque thermoplastic foil of the first and second thermoplastic foils or attached to the side of a transparent thermoplastic foil if both the first and second thermoplastic foils are transparent thermoplastic foils.

In a preferred embodiment, the base layer (35) includes substantially polyvinyl chloride and reinforcing fibres. More preferably, the base layer includes substantially polyvinyl chloride and glass fibres.

The base layer may be composed of two foils, preferably polyvinyl chloride foils, interposed by a glass fibre fleece.

The base layer may contain mineral. Particularly suitable herein are as talc or calcium carbonate (chalk), aluminum oxide, silica. The base layer may include a flame retardant.

The base layer may also be a so-called woodplastic composite (WPC), preferably containing one or more polymers or copolymers selected from the group consisting polypropylene, polyethylene and polyvinyl chloride.

Pigmented Free Radical UV Curable Inkjet Inks

The colour pattern is printed using one or more pigmented free radical UV curable inkjet inks containing a polymerizable composition having:

30 to 90 wt % of one or more compounds with one ethylenically unsaturated polymerizable group; 10 to 70 wt % of one or more compounds with two ethylenically unsaturated polymerizable groups; and 0 to 10 wt % of one or more compounds with three or more ethylenically unsaturated polymerizable groups, wherein all weight percentages wt % are based upon the total weight of the polymerizable composition.

In a particularly preferred embodiment, the amount of one or more compounds with one ethylenically unsaturated polymerizable group is larger than 72 wt %, more preferably larger than 80 wt %, wherein the weight percentage wt % is based on the total weight of the polymerizable composition.

In a preferred embodiment, the polymerizable compounds consist for more than 80 wt %, preferably more than 90 wt % of acrylates and optional N-vinyl lactams, wherein the weight percentage wt % is based on the total weight of the polymerizable composition. Such inkjet inks exhibit a high curing speed and are especially useful for UV LED curing.

In the most preferred embodiment, the inkjet inks do not contain intentionally added water or organic solvents, but may contain a very small amount of water, generally less than 5 wt % of water based on the total weight of the ink. This water was not intentionally added but came into the formulation via other components as a contamination, such as for example polar organic solvents. Higher amounts of water than 5 wt % of water based on the total weight of the ink often makes the inkjet inks instable, preferably the water content is less than 1 wt % based on the total weight of the ink and most preferably no water at all is present.

In a less preferred embodiment, the pigmented UV curable inkjet ink contains 20 to 60 wt % of organic solvent based on the total weight of the inkjet ink. In such a case, besides the UV curing means extra drying means for solvent evaporation becomes necessary.

The inkjet inks are composed into an inkjet ink set having differently coloured inkjet inks. The inkjet ink set may be a standard CMYK ink set, but is preferably a CRYK ink set wherein the magenta (M) ink is replaced by red (R) inkjet ink. The use of a red inkjet ink enhances the colour gamut for wood based colour patterns, which represent the majority of decorative panels in flooring.

The inkjet ink set may be extended with extra inks such as brown, magenta, red, green, blue, and/or orange to further enlarge the colour gamut of the ink set. The inkjet ink set may also be extended by the combination of the full density inkjet inks with light density inkjet inks. The combination of such dark and light colour inks and/or black and grey inks improves the image quality by a lowered graininess. However preferably the inkjet ink set consists of no more than 3 or 4 inkjet inks, allowing the design of single pass inkjet printers of high throughput at acceptable cost.

In addition to the polymerizable compounds, the pigmented free radical UV curable inkjet inks include one or more photoinitiators, one or more co-initiators, one or more inhibitors and one or more surfactants in amounts that are desired to be jettable and curable by inkjet printers.

In a preferred embodiment, the monofunctional polymerizable compounds consist of monoacrylates and optionally N vinyl lactams. Using monoacrylates and vinyllactams instead of e.g. methacrylates allows for high curing speeds.

The pigmented UV curable inkjet ink is a free radical curable inkjet ink. It was found in industrial inkjet printing systems that cationically curable inkjet inks posed problems of jetting reliability due to UV stray light. The UV-curing of the ink caused reflections of UV light, including UV light hitting the nozzle plate of an inkjet print head and resulting into failing nozzles due to clogging by cured ink in the nozzle. Unlike free radical ink where radical species have a much shorter lifetime, the cationic curable ink continues to cure once an acid species has been generated by UV light in the nozzle.

Polymerizable Compounds

The polymerizable compounds are preferably present in the pigmented UV curable inkjet inks in an amount of at least 60 wt %, more preferably at least 70 wt %, wherein the wt % is based on the total weight of the inkjet ink.

Any monomer and oligomer capable of free radical polymerization may be used as polymerizable compound. The viscosity of the UV curable inkjet ink can be adjusted by varying the ratio between the monomers and oligomers. The polymerizable compounds may be any monomer and/or oligomer found in the Polymer Handbook Vol 1+2, 4th edition, edited by J. BRANDRUP et al., Wiley-Interscience, 1999.

The ethylenically unsaturated polymerizable group si preferably selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the polymerizable compounds with one ethylenically unsaturated polymerizable group are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl(meth)acrylate, cyclohexyl (meth)acrylate, and 2-ethylhexyl(meth)acrylate; aryl(meth) acrylates such as benzyl(meth)acrylate, and phenyl(meth) acrylate; hydroxyalkyl(meth)acrylates such as hydroxyethyl (meth)acrylate, and hydroxypropyl(meth)acrylate; (meth) acrylates with other types of functionalities (e.g. oxiranes, amino, fluoro, polyethylene oxide, phosphate substituted) such as glycidyl (meth)acrylate, dimethylaminoethyl(meth) acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

In a more preferred embodiment, the polymerizable compounds with one ethylenically unsaturated polymerizable group are selected from monoacrylates and vinyllactams.

N-Vinyl lactams are well-known monomers in the art and a detailed description is therefore not required. N-Vinyl lactams have a vinyl group attached to the nitrogen atom of an amide group which may be further substituted in an analogous manner to the (meth)acrylate monomers. Preferred examples are N-vinyl caprolactam (NVC) and N-vinyl pyrrolidone (NVP), with NVC being particularly preferred.

In a preferred embodiment, the polymerizable compounds with one ethylenically unsaturated polymerizable group include at least one acyclic-hydrocarbon monofunctional acrylate monomer, preferably selected from octadecyl acrylate (ODA), tridecyl acrylate (TDA), isodecyl acrylate (IDA), lauryl acrylate (LA).

In a preferred embodiment, the polymerizable compounds with two or more ethylenically unsaturated polymerizable groups are selected from the group consisting of triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, alkoxylated cyclohexanone dimethanol diacrylate, caprolactam modified dipentaerythritol hexaacrylate, alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, neopentyl glycol diacrylate, vinylether acrylates, propoxylated glycerine triacrylate and propoxylated trimethylolpropane triacrylate, di-trimethylolpropane tetraacrylate, dipentaerythritol pentaacrylate, ethoxylated pentaeryhtitol tetraacrylate, methoxylated glycol acrylates and acrylate esters.

Preferred vinylether acrylates are those disclosed in U.S. Pat. No. 6,310,115 (AGFA). A particularly preferred compound is 2-(2-vinyloxyethoxy)ethyl acrylate. Other suitable vinylether acrylates are those disclosed in columns 3 and 4 of U.S. Pat. No. 6,767,980 B (NIPPON SHOKUBAI).

Colorants

The colour pigments may be black, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

A particularly preferred pigment for a cyan inkjet ink is a copper phthalocyanine pigment, more preferably C.I. Pigment Blue 15:3 or C.I. Pigment Blue 15:4.

Particularly preferred pigments for a red or magenta inkjet ink are C.I. Pigment Violet 19, C.I Pigment Red 254, C.I. Pigment Red 176, C.I. Pigment Red 202 and C.I. Pigment Red 122, and mixed crystals thereof.

Particularly preferred pigments for yellow inkjet ink are C.I Pigment Yellow 150, C.I. Pigment Yellow 155, C.I. Pigment Yellow 120 and C.I. Pigment Yellow 180, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, a black inkjet ink may include a carbon black pigment and at least one pigment selected from the group consisting of a blue pigment, a cyan pigment, a magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles.

It is also desirable to use small particles for maximum colour strength and to slow down sedimentation.

The average particle size of the pigment in the pigmented inkjet ink should be between 0.005 μm and 15 μm. Preferably the average pigment particle size is between 0.005 and 5 μm, more preferably between 0.005 and 1 μm, particularly preferably between 0.005 and 0.3 μm and most preferably between 0.040 and 0.150 μm.

The pigment is preferably used in the inkjet ink in an amount of 0.1 to 20 wt %, preferably 1 to 10 wt %, and most preferably 2 to 6 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 μm.

A white inkjet ink preferably includes a pigment with a high refractive index, preferably a refractive index greater than 1.60, preferably greater than 2.00, more preferably greater than 2.50 and most preferably greater than 2.60. Such white pigments generally have a very covering power, i.e. a limited amount of white ink is necessary to hide the colour and defects of the core layer. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS).

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Photoinitiating System

A photoinitiating system is used for initiating the polymerization of the polymerizable composition in the inkjet inks. The photoinitiating system includes one or more photoinitiators and optionally one or more co-initiators.

The photoinitiator is a free radical initiator. A free radical photoinitiator is a chemical compound that initiates polymerization of monomers and oligomers when exposed to actinic radiation by the formation of a free radical.

Two types of free radical photoinitiators can be distinguished and used in the inkjet ink of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable inkjet ink may additionally contain co-initiators. Suitable examples of co-initiators can be categorized in three groups:

1. tertiary aliphatic amines such as methyldiethanolamine, dimethylethanolamine, triethanolamine, triethylamine and N-methylmorpholine;
2. aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; and
3. (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

The preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4, 6trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment, the photoinitiator is selected from the group consisting of non-polymeric multifunctional photoinitiators, oligomeric or polymeric photoinitiators and polymerizable photoinitiators. Such a diffusion hindered photoinitiator exhibits a much lower mobility in a cured layer of the UV curable inkjet inks than a low molecular weight monofunctional photoinitiator, such as benzophenone. Including diffusion hindered photoinitiators, and also diffusion hindered co-initiators have a safety advantage for the operator of the inkjet printer.

Most preferably the diffusion hindered photoinitiator is a polymerizable photoinitiator, preferably having at least one acrylate group. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA).

A preferred amount of photoinitiator is 0-50 wt %, more preferably 0.1-20 wt %, and most preferably 0.3-15 wt % of the total weight of the curable pigment dispersion or ink.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA).

The UV curable ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the inkjet ink.

Surfactants

Surfactants are used in inkjet inks to reduce the surface tension of the ink in order to reduce the contact angle on the thermoplastic foil, i.e. to improve the wetting of the foil by the ink. On the other hand, the inkjet ink must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of UV curable inkjet inks, however, the surface tension of the inkjet ink is not only determined by the amount and type of surfactant, but also by the polymerizable compounds, the polymeric dispersants and other additives in the ink composition.

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are often preferred in curable inkjet inks, especially the reactive silicone surfactants, which are able to be polymerized together with the polymerizable compounds during the curing step.

Examples of useful commercial silicone surfactants are those supplied by BYK CHEMIE GMBH (including BykT-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.

Preparation of Inkjet Inks

The preparation of pigmented UV curable inkjet inks is well-known to the skilled person. Preferred methods of preparation are disclosed in paragraphs [0076] to [0085] of WO 2011/069943 (AGFA).

Inkjet Printing Devices

The inkjet inks may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

UV Curing Devices

The UV curable inkjet inks are cured by exposing them to ultraviolet radiation.

In inkjet printing, the curing means may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a UV flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLE

Materials

All materials used in the following examples were readily available from standard sources such as Sigma-Aldrich (Belgium) and Acros (Belgium) unless otherwise specified.

PB15:4 is an abbreviation used for a C.I. Pigment Blue 15:4 pigment, available as Hostaperm™ Blue P-BFS from CLARIANT.

S35000 is an abbreviation used for SOLSPERSE™ 35000, a polyethyleneimine-polyester hyperdispersant from LUBRIZOL.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolacton and toluene diisocyanate having an amine value of 13 mg KOH/g, a Mn of about 4,425 and a Mw of about 6,270.

EFKA is a polyacrylate dispersant available as Efka™ 7701 from BASF.

NVC is N-vinyl caprolactam available from BASF BELGIUM, Nev.

IBOA is isobornylacrylate available as Sartomer™ SR506D from ARKEMA.

ACMO is acryloyl morpholine available from RAHN.

IDA is isodecyl acrylate available as Sartomer™ SR395 from SARTOMER.

PEA is 2-phenoxyethyl acrylate available as Sartomer™ SR339C from ARKEMA.

THFA is tetrahydrofurfuryl acrylate available as Sartomer™ SR285 from ARKEMA.

TBCH is 4-tert.butylcyclohexylacrylate available under the trade name of Sartomer™ CD217 from ARKEMA.

EPA is ethoxylated nonylphenol acrylate available as Sartomer™ SR504D from ARKEMA.

Genomer™ 1122 is a monofunctional urethane acrylate from RAHN.

PEG400DA is polyethyleneglycol diacrylate available as Sartomer™ SR344 from ARKEMA.

VEEA is 2-(2'-vinyloxyethoxy)ethyl acrylate, a difunctional monomer available from NIPPON SHOKUBAI, Japan.

DPGDA is dipropyleneglycoldiacrylate available as Laromer™ DPGDA from BASF.

MPDA is 3-methyl-1,6-pentanediyl diacrylate available as Sartomer™ SR341 from ARKEMA.

TMPTA is trimethylolpropane triacrylate available as Sartomer™ SR351 from ARKEMA.

SR9035 is an ethoxylated (15) trimethylolpropane triacrylate containing fifteen ethoxy units having a molecular weight of 956 and available as Sartomer™ SR9035 from SARTOMER.

TPO is 2,4,6-Trimethylbenzoyl-diphenyl-phosphineoxide available as Omnirad™ TPO by IGM.

TPO-L is an acylphosphine oxide photoinitiator available as Omnirad™ TPO-L from IGM RESINS.

Irgacure™ 819 is a bisacylphosphineoxide photo-initiator available from BASF.

Darocur™ ITX is an isomeric mixture of 2- and 4-isopropylthioxanthone from BASF.

DETX is an abbreviation for Genocure™ DETX, a photo-initiator available from RAHN.

Irgacure™ 184, Irgacure™ 379 and Irgacure™ 907 are photo-initiators available from BASF.

Benzophenone is available as Omnirad™ BP from IGM RESINS.

PBZ is 4-phenylbenzophenone, a photo-initiator available as Genocure™ PBZ from RAHN AG.

EPD is ethyl 4-dimethylaminobenzoate available as Genocure™ EPD from RAHN AG.

ERA is 2-ethylhexyl 4-dimethylaminobenzoate available as Genocure™ EHA from RAHN.

CN963B80 is a difunctional co-initiator available as Sartomer™ CN963B80 from ARKEMA.

CN3755 is a diacrylated co-initiator available as Sartomer™ CN3755 from SARTOMER.

PMF is p-methoxy phenol.

BHT is an abbreviation for 2,6-di-tert.butyl-4-methylphenol (CASRN128-37-0) from ALDRICH CHEMICAL CO.

Cupferron™ AL is aluminum N-nitrosophenylhydroxylamine from WAKO CHEMICALS LTD.

Irgastab™ UV10 is 4-hydroxy-2,2,6,6-tetramethylpiperidinooxy sebacate from BASF.

BYK™ UV3510 is a polyethermodified polydimethylsiloxane wetting agent available from BYK CHEMIE GMBH.

Tegoglide™ 410 and Tegoglide™ 450 are surfactants from EVONIK.

Silwet™ L7500 is a silicone surfactant available from MOMENTIVE PERFORMANCE MATERIALS.

Solbin™ AL is a vinylchloride-vinylacetate-vinylalcohol copolymer from NISSIN CHEMICAL CO LTD.

UAGH™ is a vinylchloride-vinylacetate-vinylalcohol copolymer from UNIVAR.

UMOH™ is a vinylchloride-vinylacetate-vinylalcohol copolymer from WUXI HONGHUI RESIN CO LTD.

Sunvac™ GH is a vinylchloride-vinylacetate-vinylalcohol copolymer from from YANTAI SUNY CHEM INTERNATIONAL CO LTD.

LPOH™ is a vinylchloride-vinylacetate-vinylalcohol copolymer from WUXI HONGHUI RESIN CO LTD.

Solbin™ TA3 is a vinylchloride-vinylacetate-hydroxypropylacrylate copolymer from NISSIN CHEMICAL CO LTD.

Vinnol™ E22-48A is a vinylchloride-hydroxypropylacrylate copolymer from WACKER-CHEMIE.

Vinnol™ E15-40A is a vinylchloride-hydroxypropylacrylate copolymer from WACKER-CHEMIE.

Solbin™ M5 is a vinylchloride-vinylacetate-hydroxyalkylacrylate copolymer from NISSIN CHEMICAL CO LTD.

P2 is an 80 μm thick opaque white polyvinyl chloride foil.

C3 is a 500 μm thick transparent polyvinyl chloride foil.

Measurement Methods

1. Adhesion

The adhesion was determined by testing the peel strength according to EN431:1994 on a 50 mm wide sample at a speed of 100 mm/min, but with a measurement angle of 3600. For good adhesion, a peel strength of 75 N is desired.

TABLE 1

| Criterion | Evaluation |
|---|---|
| − − | less than 20 N |
| − | 20 to 59 N |
| + | 60 to 74 N |
| + + | 75 N or more |

2. Flexibility

A UV curable inkjet ink was coated on a Metamark™ MD5-100 substrate using a bar coater and a 10 μm wired bar. The coated sample was fully cured using a Fusion DRSE-120 conveyer, equipped with a Fusion VPS/I600 lamp (D-bulb), which transported the samples under the UV-lamp on a conveyer belt at a speed of 20 m/min.

Figure 4:
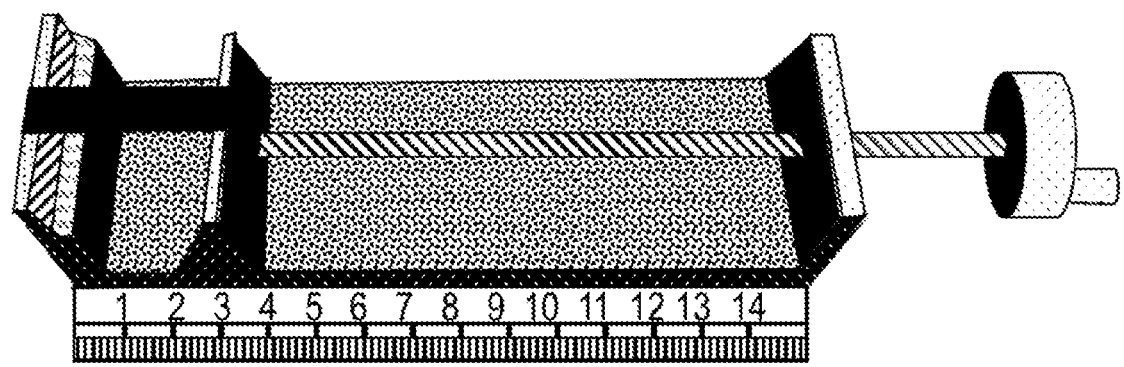
FIG. 4 is a photograph of an apparatus for determining flexibility.

The flexibility was determined using a custom built apparatus shown in FIG. 4 for stretching a strip having a width of 1 cm obtained from the coated sample using a cutter. The strip was mounted between a first fixed wall and a second wall which could be horizontally deplaced by rotation of a handle.

The strip was elongated from an original length L1 of 5 cm to the length L2 at which the strip ruptured. The elongation was calculated as a percentage according to the following mathematical formula:

$$\text{Elongation } (\%) = (L2 - L1/L1) \times 100$$

The evaluation of the flexibility was made in accordance with the classification described in Table 2.

TABLE 2

| Classification | Observation |
|---|---|
| + + | 90% elongation or more |
| + | From 30% to less 90% elongation |
| − | Less than 30% elongation |

Example 1

This example illustrates that a combination of specific pigmented UV curable inkjet inks in combination with a vinylchloride-vinylacetate-vinylalcohol copolymer provided for good adhesion and high flexibility in heat-pressing of a decorative panel using polyvinyl chloride foils.

Preparation of Cyan Pigment Dispersion

Pigmented UV curable inkjet inks were made using a cyan pigment PB15:4 dispersed according to the following method. The components according to D-1 or D-2 in Table 3 were mixed for 30 minutes using a DISPERLUX™ disperser from DISPERLUX S.A.R.L., Luxembourg. The dispersions were then milled using a Bachofen DYNOMILL ECM mill filled with 0.4 mm yttrium stabilized zirconia beads ("high wear resistant zirconia grinding media" from TOSOH Co.). The mixtures were circulated over the mill for 2 hours. After milling, the pigment dispersions were discharged over a 1 μm filter into a vessel.

TABLE 3

| wt% of component | D-1 | D-2 |
|---|---|---|
| PB15:4 | 16.00 | 15.00 |
| Dispersant | 16.00 | 10.00 |
| PMF | 0.04 | 0.14 |
| BHT | 0.10 | 0.10 |
| Cupferron ™ AL | 0.04 | 0.04 |
| Monomer | 67.82 | 74.82 |

Preparation of Inkjet Inks

Comparative inkjet inks C-1 to C-7 and inventive inkjet inks I-1 to I-3 were prepared by combining the components according to Table 4 and Table 5. The wt % is based on the total weight of the inkjet ink.

TABLE 4

| Type | wt % of component | C-1 | C-2 | C-3 | C-4 | C-5 |
|---|---|---|---|---|---|---|
| Pigment | PB15:4 | 3.00 | 3.00 | 3.00 | 2.50 | 3.00 |
| Dispersant | S35000 | | | | | 3.00 |
| | EFKA | | 2.00 | 2.00 | 2.50 | |
| | DB162 | 3.00 | | | | |
| Monomer | NVC | | 13.40 | | 16.64 | |
| | IBOA | | | | 33.29 | |
| | PEA | | | | 14.41 | |
| | ACMO | | 17.80 | | | |
| | EPA | | | | | 9.00 |
| | MPDA | 24.50 | 20.00 | | | |
| | DPGDA | 37.36 | 19.56 | 7.39 | 0.96 | 81.27 |

TABLE 4-continued

| Type | wt % of component | C-1 | C-2 | C-3 | C-4 | C-5 |
|---|---|---|---|---|---|---|
| | VEEA | | | 68.37 | | |
| | TMPTA | 14.00 | 11.00 | 4.00 | | |
| Photoinitiating System | TPO | | 2.95 | 4.95 | 2.95 | 4.95 |
| | TPO-L | 5.00 | | 3.00 | | |
| | Irgacure™ 819 | 4.00 | 2.00 | | 2.25 | |
| | DETX | 4.00 | 2.00 | 2.00 | | |
| | Darocur™ ITX | | | | 2.00 | |
| | Irgacure™ 379 | | | 2.00 | | |
| | Irgacure™ 184 | | | | | |
| | Benzophenone | | | | 4.00 | |
| | PBZ | | | | | 2.50 |
| | EPD | 5.00 | | | | 5.00 |
| | CN3755 | | 5.00 | 2.00 | 3.00 | |
| | CN963B80 | | | | 3.00 | |
| | EHA | | | | | 3.00 |
| Stabilizer | PMF | 0.01 | 0.01 | 0.01 | 0.05 | 0.04 |
| | BHT | 0.02 | 0.02 | 0.02 | 0.12 | 0.10 |
| | Cupferron™ AL | 0.01 | 0.01 | 0.01 | 0.04 | 0.04 |
| | Irgastab™ UV10 | 1.00 | 0.25 | 0.50 | | |
| Surfactant | Tegoglide™ 410 | | | | 0.30 | |
| | Byk™ UV3510 | 0.10 | 1.00 | 0.75 | | 0.10 |

TABLE 5

| Type | wt % of component | C-6 | C-7 | I-1 | I-2 | I-3 |
|---|---|---|---|---|---|---|
| Pigment | PB15:4 | 3.00 | 3.70 | 2.00 | 2.33 | 2.50 |
| Dispersant | S35000 | 3.00 | | | 1.55 | 2.50 |
| | EFKA | | | 1.33 | | |
| | DB162 | | 3.70 | | | |
| Monomer | NVC | | | 13.00 | 13.40 | 9.90 |
| | IBOA | | | 18.75 | | 18.95 |
| | PEA | | | 12.81 | | 16.35 |
| | THFA | | | | | 14.12 |
| | IDA | 15.00 | | 4.51 | 10.48 | 5.00 |
| | Genomer™ 1122 | | 8.58 | | | |
| | TBCH | | 13.92 | | | |
| | ACMO | | | 9.98 | | |
| | EPA | | | 9.00 | | |
| | PEG400DA | 10.00 | | | | |
| | DPGDA | 49.72 | 20.77 | 10.64 | | 10.60 |
| | VEEA | | 24.40 | | 56.81 | |
| | SR9035 | 7.50 | 14.51 | | | |
| Photoinitiating System | TPO | | | | 2.95 | 2.95 |
| | TPO-L | | | 4.00 | | |
| | Irgacure™ 819 | | | | 2.00 | 2.25 |
| | Darocur™ ITX | 5.00 | 2.00 | 2.00 | 2.00 | 2.00 |
| | Irgacure™ 907 | 4.00 | 5.00 | | | |
| | Irgacure™ 379 | | | 2.00 | | |
| | Irgacure™ 184 | | | 2.00 | | |
| | EPD | 2.50 | 2.50 | | | |
| | CN3755 | | | 6.00 | 7.00 | 7.50 |
| | CN963B80 | | | | | 4.00 |
| Stabilizer | PMF | 0.04 | 0.04 | 0.04 | 0.04 | 0.01 |
| | BHT | 0.10 | 0.10 | 0.10 | 0.10 | 0.02 |
| | Cupferron AL | 0.04 | 0.04 | 0.04 | 0.04 | 0.01 |
| | Irgastab™ UV10 | | | | 0.30 | 0.35 |
| | Tegoglide™ 450 | | | 0.80 | | |
| | Byk™ UV3510 | 0.10 | 0.75 | | | |
| | Silwet L7500 | | | | 1.00 | 1.00 |

All the inks had a viscosity and surface tension suitable for inkjet printing.

Manufacturing of Decorative Panel

The inkjet inks were applied on the matt side of a thermoplastic foil P2 at a thickness of 10 μm. The samples were UV cured using a Fusion DRSE-120 conveyer, equipped with a Fusion VPS/I600 lamp (D-bulb), which transported the samples under the UV-lamp on a conveyer belt at a speed of 20 m/min. The maximum output of the lamp was 1.05 J/cm$^2$ and a peak intensity of 5.6 W/cm$^2$.

A thermoplastic foil $C_3$ was coated with a solution in MEK of Solbin™ AL to a dry thickness of 3 g/m$^2$. The coated thermoplastic foils P2 were each combined with a transparent thermoplastic foil C3 by having the ink layer on the foil P2 facing the layer containing the vinylchloride-vinylacetate-vinylalcohol copolymer on the foil C3. Together with a 4 mm thick PVC foil containing glass fibres as a base layer, the foils P2 and C3 were heat pressed for 1 minute using an embossing plate at a temperature of 200° C. and a pressure of 12 bar and then cut into a decorative panel.

Evaluation and Results

The heat-pressed samples were evaluated for adhesion and flexibility. The results are shown in Table 6. The compounds with one, two and three ethylenically unsaturated polymerizable groups are represented by respectively "1=", "2=" and "3=", wherein the weight percentages thereof are based upon the total weight of the polymerizable composition.

TABLE 6

| | wt% of polymerizable compounds | | | | |
|---|---|---|---|---|---|
| Sample | 1 = | 2 = | 3 = | Flexibility | Adhesion |
| C-1 | 0 | 81 | 19 | − | − |
| C-2 | 38 | 48 | 14 | − | − |
| C-3 | 0 | 95 | 5 | − | − − |
| C-4 | 95 | 1 | 4 | + + | − |
| C-5 | 0 | 100 | 0 | − | − |
| C-6 | 18 | 73 | 9 | + | − |
| C-7 | 25 | 56 | 19 | + | − |
| I-1 | 87 | 13 | 0 | + + | + |
| I-2 | 30 | 70 | 0 | + | + |
| I-3 | 81 | 19 | 0 | + + | + + |

From Table 6, it can be seen that only the pigmented UV curable inkjet inks I-1 to I-3 were capable of delivering decorative panels having the good flexibility and good adhesion.

Example 2

This example illustrates the effect of the type of vinylchloride-vinylacetate copolymer on the adhesion when heat-pressing of a decorative panel using polyvinyl chloride foils.

Manufacturing of Decorative Panel

The inkjet inks C-1, I-2 and I-3 were used for preparing decorative panels in the same manner as disclosed in Example 1, except that the copolymer Solbin™ AL was replaced by a vinylchloride-vinylacetate copolymer as disclosed in Table 7.

TABLE 7

| Copolymer | Composition copolymer | | | | Adhesion | | |
|---|---|---|---|---|---|---|---|
| | % VC | % VA | Type | % | C-1 | I-2 | I-3 |
| UAGH ™ | 92 | 5 | VOH | 3 | – | + + | + + |
| UMOH ™ | 90 | 4 | VOH | 6 | – | + | + + |
| Sunvac ™ GH | 90 | 4 | VOH | 6 | – | + + | + + |
| LPOH ™ | 92 | 3 | VOH | 5 | – | + + | + + |
| Solbin ™ TA3 | 83 | 4 | 2-HO-acrylate | 13 | – – | – | + |
| Vinnol ™ E22-48A | 75 | 0 | 2-HO-acrylate | 25 | – | – | + |
| Vinnol ™ E15-40A | 84 | 0 | 2-HO-acrylate | 16 | – | – | – |
| Solbin ™ M5 | 85 | 14 | Decarbonic acid | 1 | – | – | – – |

The vinylchloride (VC)-vinylacetate (VA) copolymer may contain different types of a third monomer. It can be seen in Table 7 that only vinylalcohol (VOH) is capable of providing sufficient adhesion with the specific UV curable inkjet inks according to the invention I-2 and 1-3. Omitting vinylacetate (VA) or including other types of monomer like 2-hydroxy acrylate or decarbonic acid result inferior adhesion.

REFERENCE SIGNS LIST

TABLE 8

| 11 | PVC roll manufacturer |
|---|---|
| 12 | PVC roll |
| 13 | Decor printer |
| 14 | Gravure printing |
| 15 | Decorative PVC roll |
| 16 | Warehouse PVC rolls |
| 17 | Warehouse decorative PVC rolls |
| 18 | Floor panel manufacturer |
| 19 | Inkjet printing |
| 20 | Heat pressing |
| 21 | Base layer |
| 22 | Decorative panel |
| 23 | Decorative panel set |
| 31 | Tongue |
| 32 | Groove |
| 33 | Transparent thermoplastic foil |
| 34 | Transparent or opaque thermoplastic foil |
| 35 | Base layer |

The invention claimed is:

1. A method for manufacturing a decorative surface, the method comprising, in order:
   a) inkjet printing an image on a first thermoplastic foil by jetting and UV curing one or more pigmented free radical UV curable inkjet inks on the first thermoplastic foil;
   b) applying on the inkjet printed image a second thermoplastic foil including a layer including a vinylchloride-vinylacetate-vinylalcohol copolymer such that the layer faces the inkjet printed image on the first thermoplastic foil; and
   c) heat pressing the first thermoplastic foil and the second thermoplastic foil into a decorative laminate; wherein
   at least one of the first thermoplastic foil and the second thermoplastic foil is transparent; and
   the one or more pigmented free radical UV curable inkjet inks includes a polymerizable composition including:
   30 to 90 wt % of one or more compounds with one ethylenically unsaturated polymerizable group;
   10 to 70 wt % of one or more compounds with two ethylenically unsaturated polymerizable groups; and
   0 to 10 wt % of one or more compounds with three or more ethylenically unsaturated polymerizable groups, and all weight percentages wt % are based on a total weight of the polymerizable composition.

2. The method according to claim 1, further comprising:
   d) cutting the decorative laminate to form a decorative panel.

3. The method according to claim 1, wherein the first thermoplastic foil and the second thermoplastic foil include polyvinyl chloride.

4. The method according to claim 1, wherein the first thermoplastic foil is transparent.

5. The method according to claim 1, wherein the first thermoplastic foil is opaque.

6. The method according to claim 1, wherein the decorative surface includes a base layer;
   when one of the first thermoplastic foil and the second thermoplastic foil is opaque, the base layer is attached to a side of the opaque thermoplastic foil; and
   when both of the first thermoplastic foil and the second thermoplastic foil are transparent, the base layer is attached to a side of one of the transparent thermoplastic foils.

7. The method according to claim 6, wherein the base layer includes polyvinyl chloride and reinforcing fibers.

8. The method according to claim 7, wherein the reinforcing fibers include glass fibers.

9. The method according to claim 1, wherein the one or more pigmented free radical UV curable inkjet inks includes at least one monomer selected from a N-vinyl-lactam and an acyclic-hydrocarbon monoacrylate.

10. The method according to claim 1, wherein the step of heat pressing is performed by preheating the first thermoplastic foil and the second thermoplastic foil to a temperature above 130° C.

11. The method according to claim 1, wherein the vinylchloride-vinylacetate-vinylalcohol copolymer in the layer includes more than 80 wt % of vinyl chloride and 1 to 15 wt % of vinylalcohol based on a total weight of the copolymer.

12. The method according to claim 1, wherein the layer including the vinylchloride-vinylacetate-vinylalcohol copolymer has a dry weight of 1 to 10 g/m$^2$.

13. A decorative panel obtained by the method according to claim 1.

14. The decorative panel according to claim 13, wherein the decorative panel includes a tongue and groove joint that interlocks with another decorative panel.

15. The decorative panel according to claim 14, further comprising a polyurethane finishing layer on the at least one of the first thermoplastic foil and the second thermoplastic foil that is transparent.

* * * * *